Figure 3:
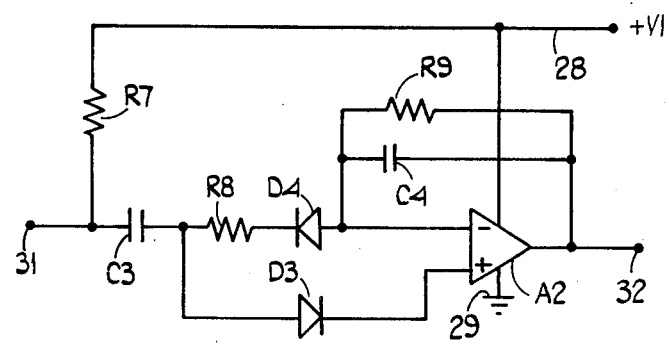

United States Patent [19]

Sutton

[11] 4,018,486
[45] Apr. 19, 1977

[54] VEHICLE WHEEL SLIDE PROTECTION SYSTEMS

[75] Inventor: Christopher John Sutton, Tamworth, England

[73] Assignee: The Lucas Electrical Company Limited, Birmingham, England

[22] Filed: Sept. 17, 1975

[21] Appl. No.: 614,021

[30] Foreign Application Priority Data

Sept. 19, 1974 United Kingdom ............. 40840/74

[52] U.S. Cl. .............................. 303/97; 188/181 A; 303/92; 340/53
[51] Int. Cl.² ......................................... B60T 8/08
[58] Field of Search ..................... 180/82 R, 105 E; 188/181; 303/20, 21, 97, 92, 105, 106, 96; 307/235 N, 235 T, 268; 317/5; 324/160–162; 330/30 D; 340/262, 263, 53, 62

[56] References Cited

UNITED STATES PATENTS

| 3,497,723 | 2/1970 | Nelson | 307/235 N X |
|---|---|---|---|
| 3,602,554 | 8/1971 | Ichimura et al. | 303/21 AF |
| 3,832,646 | 8/1974 | Szabo et al. | 330/30 D |
| 3,916,342 | 10/1975 | Higuchi et al. | 307/268 X |

Primary Examiner—Stephen G. Kunin

[57] ABSTRACT

A wheel slip protection system includes a transducer driven by a vehicle wheel and a brake control circuit for disabling the brakes when the rate of change of output of the transducer is too high. The transducer produces an oscillatory output of a frequency proportional to wheel speed and the first stage of the control circuit is a signal squaring circuit comprising a voltage comparator, the output terminals of the transducer being connected to the input terminals of the comparator and to earth by identical circuits for the purpose of cancelling noise picked up on wires connecting the transducer to the control circuit.

2 Claims, 8 Drawing Figures

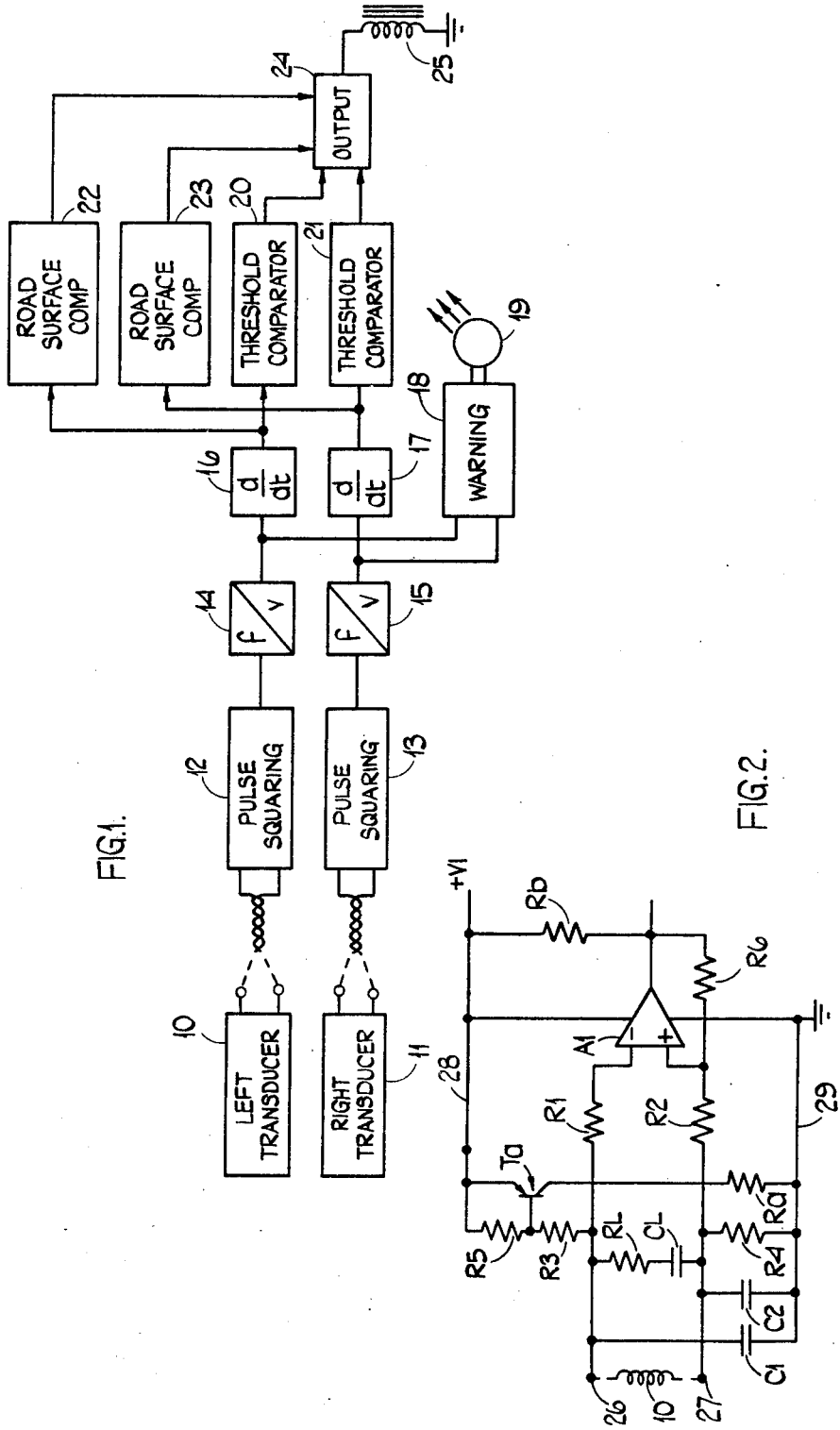

VEHICLE WHEEL SLIDE PROTECTION SYSTEMS

This invention relates to vehicle wheel slide protection systems and has as an object to provide such a system in a convenient form.

A vehicle wheel slide protection system in accordance with the invention includes a wheel speed transducer which produces an oscillatory signal at a frequency dependent on the speed of rotation of the wheel, and brake control circuit for releasing the brakes, in use, when the rate of decrease of said frequency exceeds a predetermined value, said control circuit including a comparator input stage for squaring pulses received from the wheel speed transducer, comprising first and second input terminals connected to the transducer output terminals, a pair of equal value resistors connecting the input terminals to the respective inverting and non-inverting input terminals of the comparator, and a pair of equal value capacitors connecting the input terminals to an earth terminal of the circuit.

With such an arrangement the two leads which extend from the transducer to the input terminals can be simple twisted leads as distinct from the screened leads normally employed. The balanced input network ensures that electrical noise picked up by the leads appears equally on both input terminals of the comparator and is therefore cancelled from the output of the comparator because of its high common mode rejection capability.

Figure 4:
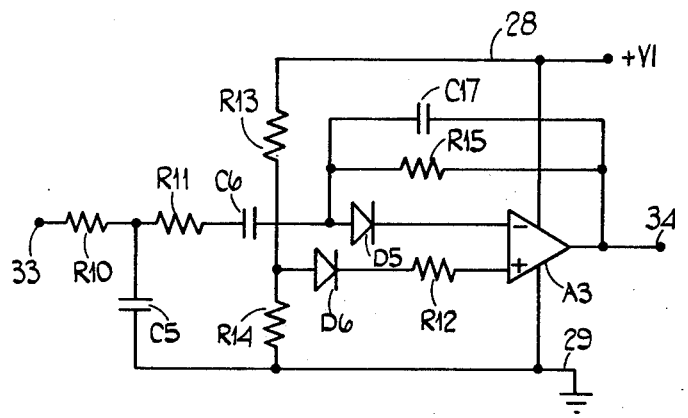
Figure 5:
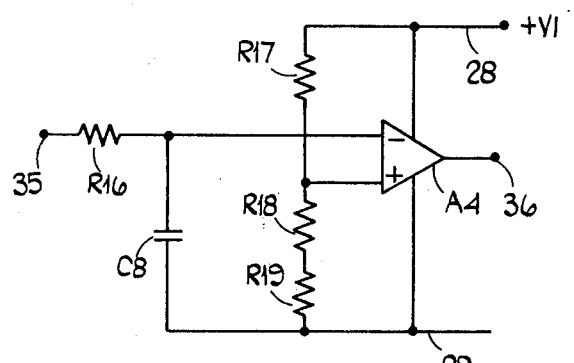
Figure 6:
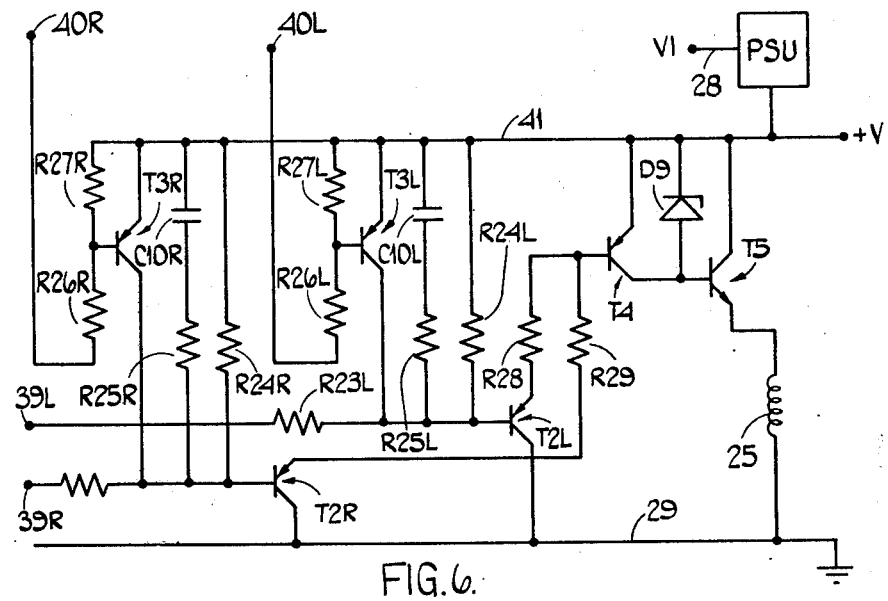
Figure 7:
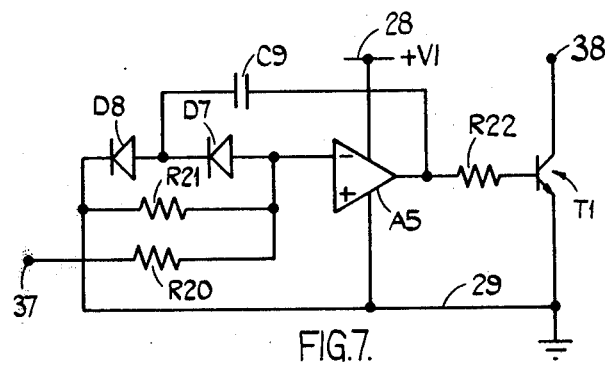
Figure 8:
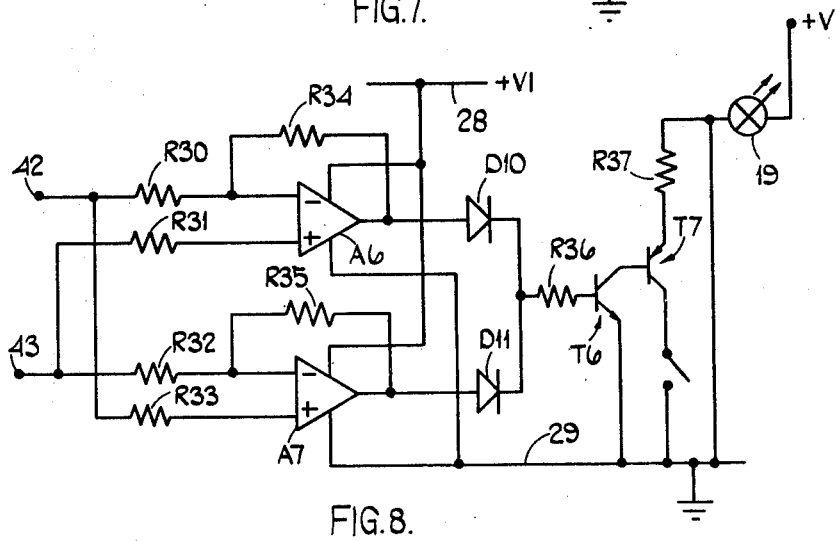

An example of the invention is shown in the accompanying drawings, in which:

FIG. 1 is a block diagram of the system;
FIG. 2 is the circuit diagram of a pulse squaring circuit shown in FIG. 1;
FIG. 3 is the circuit diagram of a frequency to voltage converter of FIG. 1;
FIG. 4 is the circuit diagram of a differentiator circuit of FIG. 1;
FIG. 5 is the circuit diagram of a threshold comparator circuit of FIG. 1;
FIG. 6 is the circuit diagram of an output circuit shown in FIG. 1;
FIG. 7 is the circuit of a road surface compensator of FIG. 1; and
FIG. 8 is the circuit diagram of a failure warning circuit of FIG. 1.

As shown in FIG. 1 the system includes two transducers 10 and 11 for detecting the speeds of the left and right rear wheels of a road vehicle. Each transducer produces an oscillatory signal at a frequency dependent on the speed of the associated wheel. The output terminals of the two transducers are connected by ordinary twisted wires to the input terminals of two balanced pulse squaring circuits 12, 13. Two frequency to voltage converters 14, 15 have their input terminals connected to the output terminals of the respective squaring circuits 12, 13. Each circuit 14, 15 produces an output the average d.c. level of which varies with the frequency of the input signal. The output terminals of the circuits 14, 15 are connected to the input terminals of two differentiating circuits 16, 17 each of which produces an output signal dependent on the magnitude of the rate of change of the d.c. level of the output of the frequency to voltage converter it is connected to. The frequency to voltage converters 14, 15 also have their output terminals connected to a failure warning circuit which causes a warning lamp 19 to be illuminated whenever the outputs of the two frequency to voltage converters differ by more than a predetermined amount.

The output terminals of the differentiating circuits are connected to two threshold comparator circuits 20 and 21 and also to two road surface compensation circuits 22 and 23. The comparator circuits 20, 21 are arranged to drive an output circuit 24 which drives a solenoid 25 which has to be de-energised in order for the vehicle brakes to be operated. The compensation circuits 22, 23 are arranged to recognise the type of wheel speed fluctuations which normally occur on cobbled or paved road surfaces and to prevent the solenoid 25 from being energised as a result of these fluctuations alone.

The circuit of one of the balanced pulse squaring circuits is shown in FIG. 2. This circuit includes a comparator $A_1$ which is preferably one quarter of a Motorola MC3302P integrated circuit. The comparator $A_1$ has its inverting and non-inverting terminals connected to the input terminals 26, 27 of the circuit by two indentical resistors $R_1$ and $R_2$ respectively. The power supply to the comparator $A_1$ is of the single rail type at a voltage V1 and to bias the terminals of the comparator $A_1$ to a voltage V1,a. A p-n-p transistor $T_a$ has its emitter connected to the rail 28 and its collector is connected via a resistor $R_a$ to the rail 29. The base of the transistor $T_a$ is connected via a resistor $R_3$ to the terminal 26 and the terminal 27 is connected by a resistor $R_4$ of slightly higher ohmic value to the rail 29. A resistor $R_5$ of high ohmic value connects the base of the transistor $T_a$ to the rail 28. When the transducer is connected correctly between the terminals 26, 27 it presents a substantially negligible resistance to d.c. through the chain $R_3$, $R_4$, $R_5$ and a voltage drop is established through the resistor $R_5$ sufficient to turn the transistor $T_a$. The emitter-base junction then passes current through the resistors $R_3$ and $R_4$ and the transducer in series to provide the correct bias voltage. If the circuit between terminals 26, 27 is broken even intermittently the transistor $T_a$ will cease conducting. A resistor $R_6$ of higher ohmic value than the resistors $R_1$ and $R_2$ is connected between the output terminal of the comparator $A_1$ to provide regenerative feed-back and a bias resistor $R_b$ connects the output terminal to rail 28. Two identical capacitors $C_1$ and $C_2$ connect the terminals 26, 27 to the earth rail 29 and an h.f. load circuit consisting of a resistor $R_L$ and a capacitor $C_L$ in series is connected between the terminals 26, 27.

The circuit of FIG. 2 is "balanced" in that the impedance of both input terminals to earth is the same, so that external noise signals picked up by both wires connecting each transducer to its associated squaring circuit will present identical signals to the two inputs of the comparator $A_1$.

As a result of the high common mode rejection ratio of the comparator $A_1$ these signals do not appear at the output of the comparator $A_1$. The capacitors $C_1$ and $C_2$, limit the noise band width of the circuit and also prevent spurious high frequency signals at either input terminal from switching the comparator $A_1$ between its two output states. Thus the output signal of the comparator $A_1$ is a clean rectangular waveform at a frequency equal to the frequency of the input signal and of constant amplitude unaffected by variations in the amplitude of the input signal.

FIG. 3 shows one of the frequency to voltage circuits 14, 15. This circuit includes an operational amplifier $A_2$ preferably one quarter of a Motorola MC3301P integrated circuit with its supply terminals connected to the rails 28, 29. The input terminal 31 of the circuit is connected to the output terminal 30 of the associated squaring circuit and is also connected to the supply rail 28 by a resistor $R_7$. The terminal 31 is connected by a capacitor $C_3$ to the anode of a diode $D_3$ which has its cathode connected to the non-inverting terminal of the amplifier $A_2$. A resistor $R_3$ connects the anode of diode $D_3$ to the cathode of a diode $D_4$ which has its anode connected to the inverting terminal of the amplifier $A_2$. Feedback from the output terminal 32 of the amplifier $A_2$ to the invert terminal thereof is provided by a resistor $R_9$ and a capacitor $C_4$ in parallel.

The gain of the amplifier $A_2$ increases with the frequency of the input signal because of its frequency dependent feedback circuit. The rising and falling edges of the pulses supplied by the squaring circuit are converted by the capacitor $C_3$ into positive and negative going pulses which routed to the non-inverting and inverting terminals of the amplifier $A_2$ via the diodes $D_3$ and $D_4$ so that positive going pulses are produced at the output terminal 32 of amplitude determined by the frequency, as a result of the increase of gain with frequency.

The circuit shown in FIG. 4 is one of the differentiating circuits 17, 18 and includes a passive low pass filter in its input stage to remove the oscillatory components of the output of the frequency to voltage converter circuit and pass on only the average d.c. component of this output. This low pass filter consists of a pair of resistors $R_{10}$, $R_{11}$ in series and a capacitor $C_5$ connecting the interconnection of these resistors to the earth rail 29. The resistor $R_{10}$ is connected to the input terminal 33 which is connected to the output terminal 32 of the associated frequency to voltage converter and the resistor $R_{11}$ is connected via a capacitor $C_6$ to the anode of a diode $D_5$ which has its cathode connected to the inverting terminal of an operational amplifier $A_3$ preferably one quarter of a Motorola MC3301P integrated circuit. A further diode $D_6$ has its cathode connected via a resistor $R_{12}$ to the non-inverting terminal of the amplifier $A_3$ and its anode connected to the interconnection of two equal resistors $R_{13}$, $R_{14}$ connected as a voltage divider between the supply rail 28 and the earth rail 29. The resistors $R_{13}$, $R_{14}$ and the diode $D_6$ may be common to both circuits 16 and 17. Feedback is provided from the output terminal 34 of the amplifier $A_3$ to the anode of diode $D_5$ via a resistor $R_{15}$ and a capacitor $C_7$ in parallel.

The circuit of FIG. 4 produces a positive going output signal whenever the input signal is decreasing. The magnitude of the output signal depends on the rate of change of the input signal and increases as the rate of change increases.

The simple circuit shown in FIG. 5 is a straightforward voltage comparator $A_4$, preferably one quarter of a Motorola MC3302P integrated circuit. The input terminal 35, which is connected to the output terminal 34 of the associated differentiating circuit 16 or 17, is connected to the inverting terminal of the comparator $A_4$ via a resistor $R_{16}$. The inverting terminal is also connected by a capacitor $C_8$ to the ground rail 29, so that the inverting terminal only senses the average d.c. level of any high frequency components in the input. A resistance chain $R_{17}$, $R_{18}$ and $R_{19}$ is connected between the supply rail 28 and the earth rail 29 and a tapping from this chain is connected to the non-inverting terminal of the amplifier $A_4$ to provide a voltage reference level. A single resistor may be substituted for the two resistors $R_{18}$ and $R_{19}$.

The two comparators $A_1$ of the squaring circuits 12 and 13 and the two comparators $A_4$ of the threshold comparator circuits 20, 21 may be provided by a single MC3301P integrated circuit, the two amplifiers $A_2$ and the two amplifiers $A_3$ being provided by a single MC3302P integrated circuit.

The circuit shown in FIG. 7 is one of the two road surface compensation circuits 22, 23 and includes an opertional amplifier $A_5$ which is preferably one quarter of a Motorola MC3301P integrated circuit. The input terminal 37 of the circuit shown is connected via a resistor $R_{20}$ to the inverting terminal of the amplifier $A_5$. The resistor $R_{21}$ connects the inverting terminal to the earth rail 29 and a diode $D_7$ has its anode connected to the inverting terminal. A diode $D_8$ has its anode connected to the cathode of the diode $D_7$ and its cathode connected to the ground rail 29. A capacitor $C_9$ is connected between the output terminal of the amplifier $A_5$ and the anode of diode $D_8$. The circuit thus far described acts as a fast half-wave rectifier providing a d.c. output which increases with both the amplitude and the frequency of the fluctuations of the input. The output terminal of the amplifier $A_5$ is connected by a resistor $R_{22}$ of an n-p-n transistor $T_1$ which has its emitter grounded to the rail 29. When there is a positive supply connected to the collector of the transistor $T_1$ via a terminal 38 it will be conductive whenever the amplifier $A_5$ produces a sufficient output voltage.

Turning now to FIG. 6 there is shown the output circuit 24 which combines the outputs of the two signal processing channels and drives the solenoid 25. The left input terminal 39L is connected via a resistor $R_{23}L$ to the base of a p-n-p transistor $T_2L$. This transistor has its collector grounded to the rail 29 and its base connected to a rail 41 at a voltage V higher than the voltage V1 by a resistor $R_{24}L$. A resistor $R_{25}L$ and a capacitor $C_{10}L$ in series also connect the base of transistor $T_2L$ to the rail 41. A p-n-p transistor $T_3L$ has its emitter connected to the rail 41 and its collector connected to the base of the transistor $T_2L$. The base of transistor $T_3L$ is connected by a resistor $R_{27}L$ to the rail 41 and by a resistor $R_{26}L$ to a terminal $40_L$ connected to the terminal 38 of the associated compensation circuit 22. An identical arrangement of components shown in FIG. 6 with R suffices instead of L is provided for the right channel. A pair of resistors $R_{28}$, $R_{29}$ connect the emitters of the transistors $T_2L$ and $T_2R$ to the base of a p-n-p driver transistor $T_4$ which has its emitter connected to the rail 41. An n-p-n power transistor $T_5$ has its collector connected to the rail 41 and its base connected to the collector of the transistor $T_4$. The solenoid 25 is connected between the emitter of the transistor $T_5$ and the earth rail 29. A zener diode $D_9$ has its anode connected to the base of the transistor $T_5$ and its cathode connected to the rail 41.

In normal conditions the comparators $A_4$ produce outputs which render the transistors $T_2L$ and $T_2R$ non-conductive so that the transistor $T_4$ is non-conductive and does not supply base current to the power transistor $T_5$. If the output of either of the differentiating circuits 16, 17 rises above the reference level, indicating an abnormally fast rate of wheel deceleration, the output of the associated comparator $A_4$ falls and the associated transistor $T_2L$ or $T_2R$ becomes conductive, drawing base current from the driver transistor $T_4$ and thereby causing current to pass through the power transistor $T_5$ into the solenoid 25. This effects release of the brakes. In the event that the output of the comparator 20 or 21 has fallen because of high frequency fluctuations in the output of the differentiating circuit 16 or 17, these fluctuations will cause the circuits 22 or 23 to operate rendering the associated transistor $T_1$ conductive. As a result the transistor $T_3R$ or $T_3L$ wil become conductive and the transistor $T_2R$ or $T_2L$ will thus remain non-conductive.

The warning circuit shown in FIG. 8 consists simply of two difference amplifiers utilizing operational amplifiers $A_6$ and $A_7$ which may be part of the same integrated circuit as the two amplifiers $A_5$. The two input terminals 42, 43, from the two frequency to voltage converters, are connected by equal resistors $R_{30}$, $R_{31}$, $R_{32}$ and $R_{33}$ to the input terminals of the amplifiers $A_6$ and $A_7$ as shown and each amplifier has a feedback resistor $R_{34}$, $R_{35}$ so that the output of the amplifier $A_6$ is $k(a-b)$ and that of amplifier $A_7$ is $k(b-a)$ where $k$ is a constant dependent on the relative values of the resistors $R_{30}$ and $R_{34}$ and $a$ and $b$ are the input signals. Two diodes $D_{10}$ and $D_{11}$ have their anodes connected to the output terminals of the respective amplifiers $A_6$ and $A_7$ and have their cathodes connected together and to the base of a n-p-n transistor $T_6$ via a resistor $R_{36}$. The emitter of the transistor $T_6$ is connected to the earth rail 39 and its collector connected to the base of a p-n-p transistor $T_7$ which has its collector grounded to the rail 39 and its emitter connected via a resistor $R_{37}$ to one terminal of the lamp 19 the other terminal of which is connected to the supply rail 41. The lamp 19 illuminates when the voltage signal produced at the output terminal of either of the amplifiers $A_6$, $A_7$ is sufficient to turn on the transistor $T_6$.

A switch 44 is connected between the first-mentioned terminal of the lamp 19 and the earth rail 29 and is actuated by the brake pedal so that the lamp 19 also lights whenever the brakes are applied.

I claim:
1. A vehicle wheel slide protection system for use with a vehicle wheel provided with brakes, including a wheel speed transducer having first and second output terminals and which produces an oscillatory signal at a frequency dependent on the speed of rotation of the wheel, and a brake control circuit for releasing the brakes of the wheel, in use, when the rate of decrease of said frequency exceeds a predetermined value, said control circuit having an earth terminal and including a comparator input stage for squaring pluses received from the wheel speed transducer and inverting and non-inverting input terminals, comprising first and second input terminals connected to the respective first and second transducer output terminals, a pair of equal value resistors connecting the input terminals of said comparator to the respective inverting and non-inverting input terminals of the comparator, a pair of equal value capacitors connecting the input terminals to said earth terminal of the circuit, a supply with two supply rails, a bias circuit for biasing said comparator input terminals to a d.c. level intermediate the supply voltage, said bias circuit comprising a transistor having a collector, a base and an emitter, said emitter being connected to one supply rail and said collector connected via a load to the other supply rail, a first resistor connecting the base of the transistor to said one supply rail, a second resistor connecting the base of the transistor to one input terminal, and a third resistor connecting the other input terminal to the other supply rail, the transducer normally providing a connection between the input terminals so that the transistor is turned on and current flowing through the base-emitter junction thereof and said second and third resistors biasing the input terminals, the transistor being turned off when the connection between the input terminals by the transducer is severed.

2. A vehicle wheel slide protection circuit is claimed in claim 1 including an h.f. load circuit including a resistor and a capacitor in series connected in shunt between the input terminals.

* * * * *